US012703356B2

(12) United States Patent
Sagoian et al.

(10) Patent No.: US 12,703,356 B2
(45) Date of Patent: Aug. 11, 2026

(54) SYSTEM AND METHOD FOR CUT-IN AND/OR LANE CHANGING PREDICTION IN A VEHICLE

(71) Applicant: Dr. Ing. h. c. F. Porsche Aktiengesellschaft, Stuttgart (DE)

(72) Inventors: Arsen Sagoian, Cluj Napoc (RO); Adrian-Sergiu Fatol, Cluj Napoca (RO); Ionut Giani Statie, Ramnicu Valcea (RO); George Florin Grosu, Sebes (RO); Philipp Wustmann, Hambrücken (DE)

(73) Assignee: Dr. Ing. h. c. F. Porsche Aktiengesellschaft, Stuttgart (DE)

( * ) Notice: Subject to any disclaimer, the term of this patent is extended or adjusted under 35 U.S.C. 154(b) by 168 days.

(21) Appl. No.: 18/577,768

(22) PCT Filed: Jul. 9, 2021

(86) PCT No.: PCT/EP2021/025252
§ 371 (c)(1),
(2) Date: Jan. 9, 2024

(87) PCT Pub. No.: WO2023/280368
PCT Pub. Date: Jan. 12, 2023

(65) Prior Publication Data

US 2024/0321092 A1 Sep. 26, 2024

(51) Int. Cl.
*B60W 30/095* (2012.01)
*B60W 40/04* (2006.01)
(Continued)

(52) U.S. Cl.
CPC ...... *B60W 30/0956* (2013.01); *B60W 30/095* (2013.01); *B60W 40/04* (2013.01);
(Continued)

(58) Field of Classification Search
CPC ........... B60W 30/0956; B60W 30/095; B60W 40/04; G06V 20/58; G08G 1/052; G08G 1/0967; G08G 1/163; G08G 1/04
See application file for complete search history.

(56) References Cited

U.S. PATENT DOCUMENTS 7,610,121 B2 * 10/2009 Nishira ..................... B60T 7/22 701/1
10,611,371 B2 * 4/2020 Kusano ................. G06V 10/82
(Continued)

OTHER PUBLICATIONS

International Search Report dated Mar. 30, 2022.

*Primary Examiner* — Dale W Hilgendorf
(74) *Attorney, Agent, or Firm* — Buchanan Ingersoll & Rooney PC

(57) ABSTRACT

A method and a system for cut-in and/or lane changing prediction in a first vehicle (102) includes an interface (104), in particular to a data bus, of the first vehicle (102) that is configured to receive a sequence of data sets. Each data set in the sequence has values that are indicative of a position or movement of a second vehicle relative the first vehicle. The system includes a model (108), in particular a recurrent neural network, that has a long short term memory that is configured to map the values from the sequence to a quantity for the sequence, in particular at least one binary label, indicative of a probability and/or confidence that a start of a cut-in and/or lane changing event by the second vehicle is detected or that no start of a cut-in and/or lane changing event by the second vehicle is detected.

15 Claims, 2 Drawing Sheets

(51) Int. Cl.

| | |
|---|---|
| ***G06V 20/58*** | (2022.01) |
| ***G08G 1/04*** | (2006.01) |
| ***G08G 1/052*** | (2006.01) |
| ***G08G 1/0967*** | (2006.01) |
| ***G08G 1/16*** | (2006.01) |

(52) U.S. Cl.

CPC ............. *G06V 20/58* (2022.01); *G08G 1/052* (2013.01); *G08G 1/0967* (2013.01); *G08G 1/163* (2013.01); *G08G 1/04* (2013.01)

(56) References Cited

U.S. PATENT DOCUMENTS 11,643,092 B2 * 5/2023 Doemling ................ G06N 3/08 701/300
12,024,204 B2 * 7/2024 Fedorov .......... B60W 30/18163
12,071,144 B2 * 8/2024 Lan ................... B60W 50/0097
2005/0015203 A1 * 1/2005 Nishira ................. B60W 50/16 340/436
2005/0256630 A1 * 11/2005 Nishira .............. B60K 31/0008 701/41
2015/0266477 A1 * 9/2015 Schmudderich ...... B60W 30/09 701/98
2015/0321699 A1 * 11/2015 Rebhan ........... B60W 30/18163 701/23
2016/0325743 A1 * 11/2016 Schmüdderich ...... B60W 30/14
2017/0154225 A1 * 6/2017 Stein ............... B60W 60/00274
2019/0049987 A1 * 2/2019 Djuric ...................... G06N 3/08
2019/0077398 A1 * 3/2019 Kusano ............. B60W 30/0956
2020/0082248 A1 * 3/2020 Villegas ............... G06N 3/0455
2020/0258380 A1 * 8/2020 Wissing ................... G08G 1/04
2021/0061294 A1 * 3/2021 Doemling .............. G06N 3/045
2022/0398924 A1 * 12/2022 Lucas .................... G06N 3/084
2023/0053459 A1 * 2/2023 You ...................... G06V 10/765
2023/0138112 A1 * 5/2023 Gross ................... G05D 1/0027 701/24

* cited by examiner

SYSTEM AND METHOD FOR CUT-IN AND/OR LANE CHANGING PREDICTION IN A VEHICLE

FIELD OF THE INVENTION

The invention relates to a system and method for cut-in and/or lane changing prediction in a vehicle.

RELATED ART

US 2019/0077398 A1 discloses a system and method for vehicle lane change prediction using structural recurrent neural networks.

SUMMARY OF THE INVENTION

The system and method disclosed herein provide an improved cut-in and/or lane changing prediction in a vehicle.

The system for cut-in and/or lane changing prediction in a first vehicle comprises an interface, in particular to a data bus of the first vehicle that is configured to receive a sequence of data sets. Each data set in the sequence comprises values, in particular from a long range radar, a camera, and/or a sensor data fusion, that are indicative of a position or movement of a second vehicle in particular relative the first vehicle. The system comprises a model, in particular a recurrent neural network comprising a long short term memory. The model is configured to map the values from the sequence to a quantity for the sequence, in particular at least one binary label. The quantity is indicative of a probability and/or confidence, in particular per data set, that a start of a cut-in and/or lane changing event by the second vehicle is detected or that no start of a cut-in and/or lane changing event by the second vehicle is detected. The data bus may be a FlexRay or CAN bus. The prediction is based on a research of the mentioned signals. Clear patterns and correlations in a time evolution of different signals are identified in the sequence of data sets. This leads to the possibility to model the statistical properties of the signals, and thus the model is capable to identify the moments of cut-in and/or lane changing maneuvers.

The model of some embodiments is configured to distinguish whether the quantity indicates a true positive or a true negative depending on a threshold for the quantity.

The interface may be configured to receive values indicative of the position or movement of the second vehicle, to eliminate values that comprise redundant information from the plurality of values, and to provide values from the sequence without the eliminated values for mapping by the model. The interface is configured to mirror values that originate from one side of the vehicle to mirrored values for the other side of the vehicle and to provide the mirrored values for mapping by the model. Thus, only the events of interest as cut-Ins or non-cut-ins are extracted as data points. This reduces the computational requirements and facilitates the use in stand-alone system.

The interface may be configured to receive the sequence in a fixed timeframe, and thereby further reduces the computational requirements for the stand-alone system.

The system may comprise a set of, in particular eight, cameras and/or the interface may be configured to receive values from a set of camera signals that describe a time evolution of physical variables related to velocity, acceleration, position and/or distance of the second vehicle relative to the first vehicle or relative to at least one lane line separating a lane in which the first vehicle is from a lane in which the second vehicle is in.

The interface may be configured to provide each data set with a timestamp, and the model is configured to determine a label at each timestamp.

The method for cut-in and/or lane changing prediction in a first vehicle may comprise receiving from a data bus, in particular a FlexRay or CAN bus, of the first vehicle, a sequence of data sets. Each data set in the sequence comprises values, in particular values from a long range radar, a camera, and/or a sensor data fusion, that are indicative of a position or movement of a second vehicle relative the first vehicle. The method further may include mapping, with a model, in particular a recurrent neural network comprising a long short term memory, the values from the sequence to a quantity for the sequence, in particular at least one binary label, indicative of a probability and/or confidence in particular per data set that a start of a cut-in and/or lane changing event by the second vehicle is detected or that no start of a cut-in and/or lane changing event by the second vehicle is detected.

The method may comprise distinguishing whether the quantity indicates a true positive or a true negative depending on a threshold for the quantity.

The method may comprise receiving a plurality of values indicative of the position or movement of the second vehicle, and eliminating values that comprise redundant information from the plurality of values, and to provide values from the sequence without the eliminated values for mapping by the model.

The method may comprise mirroring values that originate from one side of the vehicle to mirrored values for the other side of the vehicle and providing the mirrored values for mapping by the model.

The method may comprise receiving the sequence in a fixed timeframe.

The method may comprise capturing at least a part of the values with a set of, for example eight, cameras and/or receiving at least a part of the values from a set of camera signals that describe a time evolution of physical variables related to velocity, acceleration, position and/or distance of the second vehicle relative to the first vehicle or relative to at least one lane line separating a lane in which the first vehicle is located from a lane in which the second vehicle is located.

The method may comprises providing each data set with a timestamp and determining a label at each timestamp.

Further embodiments are derivable from the enclosed description and the drawing.

DETAILED DESCRIPTION

A development of an autonomous driving system implies a multitude of variables regarding the environment that can be crucial in providing the drivers safety and comfort.

One important variable for possible events that can increase a risk towards the drivers is a cut-in maneuver. The following description uses the cut-in maneuver as an example. A lane changing maneuver may be processed as it is described below for the cut-in maneuver. The cut-in maneuver can simply be described from the view of a first vehicle by the moment in which a second vehicle around the first vehicle performs a driving maneuver such that it advances in front of the first vehicle.

Cut-in events are rare and exhibit a non-deterministic nature.

To facilitate a real-time prediction of such cut-in events a long short term memory, LSTM-based recurrent neural network, RNN is used along with signals from a data bus of the first vehicle, e.g. FlexRay or CAN signals acquired from sensors in the first vehicle. A reaction to a detection of a cut-in maneuver or cut-in event is deployable on the first vehicle with an actuator directly or a function controlling such actuator, e.g. with an adaptive cruise control, ACC.

According to one example, a LSTM-based RNN is trained, which can output a probability of a cut-in event assigned to the second vehicle based on the sensor signals. The sensor signals are processed in a time series form. The sensor signals may be captured by a long range radar, LRR, or a camera or a set of cameras. A function of sensor data fusion may provide signals as well.

The RNN in the example is LSTM-based. More generally, the RNN is a model that is trained e.g. on sample data comprising of the signals mentioned above.

The signals may be captured in the first vehicle or another vehicle. In the example, the signals describe real-life events.

The aim of the training is to detect cut-in maneuvers with the model as a stand-alone module. The so trained model can be used in a variety of applications that can improve driving experience. One example of applications is using an output of the model to enhance the ACC.

Figure 1:
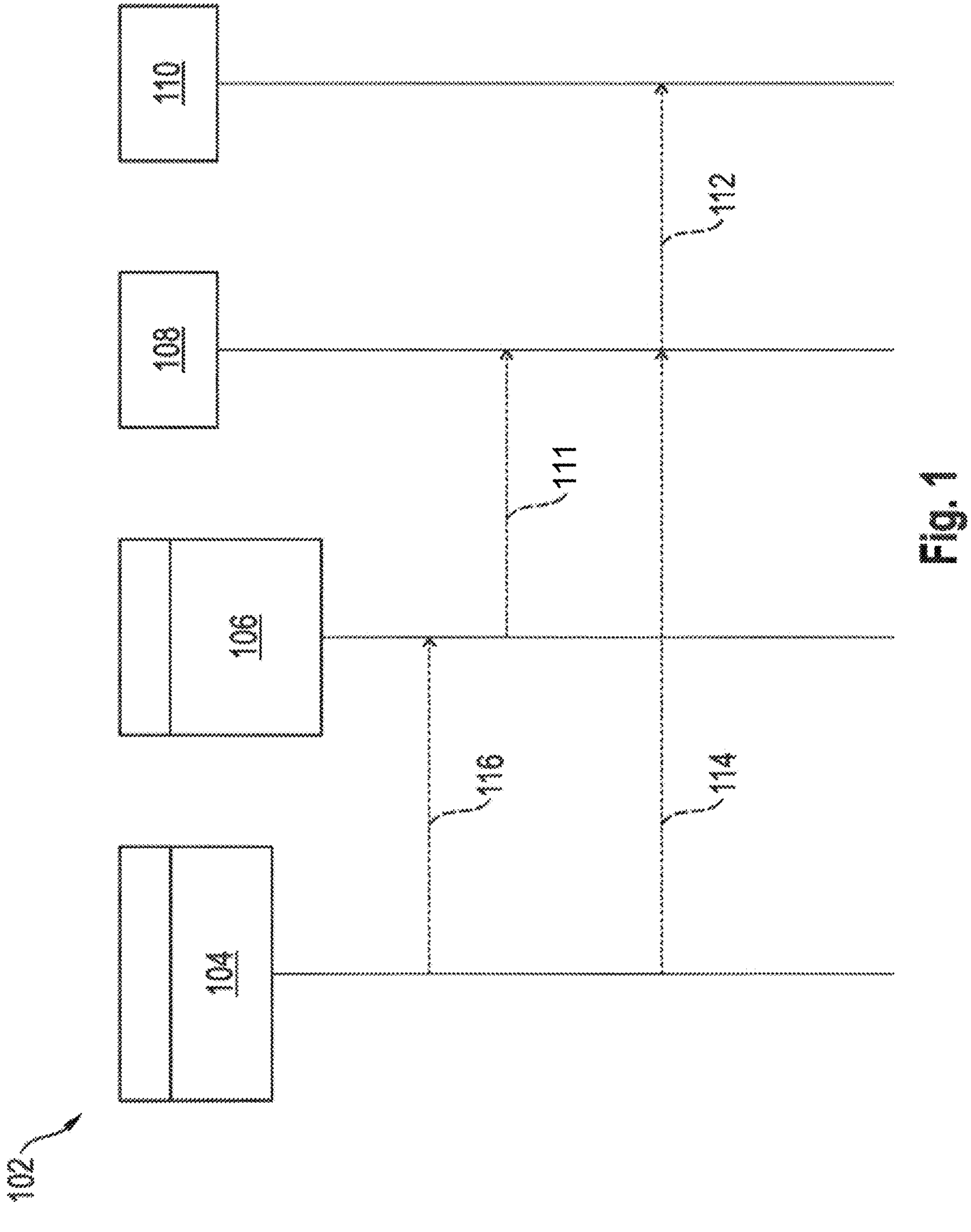
FIG. 1 schematically depicts a part of a system in a vehicle.

FIG. 1 schematically depicts a part of a system in the first vehicle 102. The system is configured for cut-in prediction in the first vehicle 102.

The system comprises an interface 104. The interface 104 interfaces with a data bus, in particular a FlexRay or CAN bus, of the first vehicle 102. The interface 104 is configured to receive a sequence of data sets. The interface 104 is in one example configured to receive the sequence in a fixed timeframe. The sequence of data sets may comprise the sensor signals in a time series form.

Each data set in the sequence comprises values that are indicative of a position or movement of the second vehicle. The values are for example indicative of a relative position or a relative movement of the second vehicle with respect to the first vehicle. The data set may comprise sensor signals from a long range radar or at least one camera. The data set may be the result of a preprocessing of sensor information with a sensor data fusion function.

The system that is depicted in FIG. 1 comprises a training device 106. The training device 106 is optional to the system. The system is operational as a stand-alone system without the training device 106 after training. The training device 106 and a training will be described below. In the following description, it is assumed that at least one instance of training has completed. The training device 106 may be present in the stand alone system for continuing training as well.

The system comprises a model 108. The model 108 is configured to map the values of the sequence to a quantity for the sequence that is indicative of a probability and/or confidence that a start of a cut-in event by the second vehicle is detected or that no start of a cut-in event by the second vehicle is detected.

The quantity in the example comprises at least one binary label that indicates with a value TRUE that a cut-in event is detected and that indicates with a value FALSE that no cut-in event is detected. The mapping is categorical in the sense that the input to the model 108 is mapped to a category that the quantity indicates. The model 108 is configured to distinguish whether the quantity indicates a true positive or a true negative depending on a threshold for the quantity.

The model 108 in the example is trained. As a result of the training, the model 108 in the example is a trained recurrent neural network comprising a long short term memory.

The system in the example comprises at least one function 110 that utilizes an output 112 of the model 108. The output 112 of the model 108 is a cut-in prediction. The cut-in prediction may be the quantity. The cut-in prediction may be either the value TRUE or the value FALSE or a numeric representation thereof. In the example, the function 110 is the ACC function. The ACC function comprises an interface for receiving the cut-in prediction and is configured to respond to the cut-in prediction. The actual response of the ACC function can be any response. Instead of using the ACC function, any other function in the first vehicle 102 may be configured and used alike.

The interface 104 and the model 108 are configured to establish a real-time communication 114. The interface 104 provides the sequence of data sets to the model 108 via the real-time communication 114.

The interface 104 may be configured to receive a plurality of values indicative of the position or movement of the second vehicle and determine the sequence of data set based thereon.

In an example, the interface 104 is configured to eliminate values from the plurality of values that it receives that comprise redundant information. In the example, the interface 104 is configured to determine the values in the sequence of data sets without the redundant information. This means, the interface 104 is configured to provide values without the eliminated values for mapping by the model 108.

The interface 104 may be configured to receive values from a set of camera signals that describe a time evolution of physical variables related to velocity, acceleration and/or position. The velocity, acceleration and/or position may be received each with a set of two values based on a Cartesian coordinate system. The interface 104 may be configured to receive values from the set of camera signals that describe a distance of the second vehicle relative to the first vehicle or relative to at least one lane line separating a lane in which the first vehicle is from a lane in which the second vehicle is. These values may be provided in the sequence of data sets.

The system may comprise a set of, in particular, eight cameras.

In one example, the interface 104 may be configured to provide each data set with a timestamp. In this example, the model 108 may be configured to determine a label at each timestamp.

For training, the interface 104 and the training device 106 may establish a communication 116. The communication 116 may be established and used as described above for the real-time communication 114. For training, instead of a real-time communication, training data may be prerecorded as well.

In the example, the training is performed with training data that comprises a plurality of sequences of data sets. Each set is an event in the training either that is labelled as being a cut-in maneuver or that are labelled not being a cut-in maneuver. During the training, correlations between different time series of signals and/or patterns in a time series of one signal is identified from a time evolution thereof. This way, the model 108 learns statistical properties of at least one signal in the sequence of data sets.

In order to predict a cut-In maneuver based on time series data the model 108 in the example uses the aforementioned categorical labeling approach of variables at each timestamp.

The training data may comprise events that are generated by vehicles on both side lanes relative to the first vehicle. Based on the hypothesis that the signals have symmetry, one side of the first vehicle may be set as reference and every event that originates from the other side may be mirrored to the reference side. This leads to a reduction of dimensionality in the training data.

Furthermore, this enables the model 108 to predict cut-in events for objects on both side lanes without increasing the number of the input signals and the dimension of the model 108.

This contributes to a better generalization in the process of identifying cut-in events.

To improve the performance of the model 108 a normalization of values 111 may be employed during training and prediction.

The interface 104 and the model 108 may use for training and/or prediction a sliding window of e.g. 50 timestamps length. The length may be equivalent to a two seconds window. Thus, cut-in events are detectable from data sets of the last 50 timestamps or the last two seconds.

Figure 2:
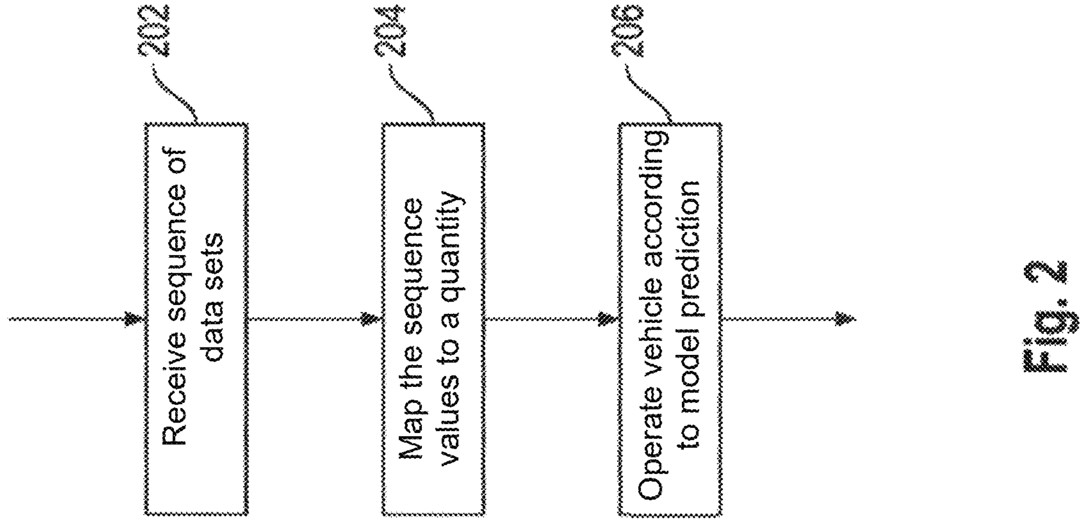
FIG. 2 depicts steps in a method.

A method of cut-in prediction is described below, referencing FIG. 2.

In a step 202, the sequence of data sets is received. The sequence may be received in the fixed timeframe. Each data set may be provided with a timestamp.

According to one example, the plurality of values indicative of the position or movement of the second vehicle is received and provided to the model 108 for mapping. In one example, values that comprise redundant information are eliminated from the plurality of values. The values from the sequence are in this example provided for mapping by the model 108 without the eliminated values.

In one example, values that originate from one side of the first vehicle are mirrored to mirrored values that represent values of the other side of the first vehicle. In this example, the mirrored values are provided for mapping by the model 108.

The method may comprise capturing at least a part of the values with the set of cameras. The method may comprise receiving at least a part of the values from signals of the set of cameras. The camera signals may describe a time evolution of physical variables. The physical variables may related to a velocity, an acceleration, a position. These may be absolute values or relative values with respect to the first vehicle. The physical variables may relate to a distance of the second vehicle relative to the first vehicle. The physical values may relate to a distance of the second vehicle relative to at least one lane line separating a lane in which the first vehicle is located from a lane in which the second vehicle is located.

Afterwards, in a step 204 the values from the sequence are mapped to a quantity for the sequence.

The method may comprise distinguishing whether the quantity indicates a true positive or a true negative depending on a threshold for the quantity.

The quantity may be determined to comprise a label for the cut-in prediction at each timestamp. For example, the quantity may comprise a sequence of binary values that corresponds to the sequence that is evaluated and comprises one binary label per data set in the sequence.

Optionally, the first vehicle is operated according to the prediction of the model in a step 206. In the example, the ACC function receives the cut-in prediction and responds to the cut-in prediction.

Optionally, the model 108 is trained. To that end, different sequences that are labelled with ground truth quantities or the correct labels are provided and the steps 202 and 204 are repeatedly executed for one batch or many batches sampled from the different sequences. After processing the batch or after each of the batches is processed, parameters of the model 108 are updated depending on a loss function that compares each predicted quantity to its ground truth quantity.

The sequence of data sets in training may be a previously recorded sequence that is read from a database. The sequence of data sets after the training may consist of data sets that are recorded in the fixed timeframe to allow real-time processing in the stand alone system.

The invention claimed is:

1. A system for cut-in and/or lane changing prediction in a first vehicle (102), the system comprising an interface (104) connected to a data bus of the first vehicle (102), the interface being configured to receive a sequence of data sets, each of the data sets in the sequence having values that are indicative of a position or movement of a second vehicle relative to the first vehicle;

a model (108) with a long short term memory, the model (108) being configured to map the values from the sequence to a quantity for the sequence, wherein the quantity is indicative of a probability and/or confidence per data set that a start of a cut-in and/or lane changing event by the second vehicle is detected or that no start of the cut-in and/or lane changing event by the second vehicle is detected;

the interface (104) being configured to mirror values that originate from one side of the first vehicle to mirrored values for the other side of the first vehicle and to provide the mirrored values for mapping by the model (108); and an adaptive cruise control system configured to control the first vehicle in response to the detection of the start of the cut-in and/or land changing event according to a mapping result of the model.

2. The system of claim 1, wherein the model is configured to distinguish whether the quantity indicates a true positive or a true negative depending on a threshold for the quantity.

3. The system of claim 1, wherein the interface (104) is configured to receive a plurality of values indicative of the position or movement of the second vehicle, to eliminate values that comprise redundant information from the plurality of values, and to provide values from the sequence without the eliminated values for mapping by the model (108).

4. The system of claim 1, wherein the interface is configured to receive the sequence in a fixed timeframe.

5. The system of claim 1, wherein the system comprises a set of cameras and the interface is configured to receive values from a set of camera signals that describe a time evolution of physical variables related to velocity, acceleration, position and/or distance of the second vehicle relative to the first vehicle or relative to at least one lane line separating a lane in which the first vehicle is located from a lane in which the second vehicle located.

6. The system of claim 1, wherein the interface is configured to provide each data set with a timestamp, and wherein the model is configured to determine a label at each timestamp.

7. The system of claim 1, wherein the interface is configured to eliminate one or more values from the plurality of received data sets that contain redundant information.

8. A method for cut-in and/or lane changing prediction in a first vehicle, the method comprising:

receiving from a data bus of the first vehicle, a sequence of data sets, wherein each data set in the sequence comprises values from a long range radar, a camera, and/or a sensor data fusion, that are indicative of a position or movement of a second vehicle relative the first vehicle;

mirroring values that originate from one side of the first vehicle to mirrored values for the other side of the first vehicle and providing the mirrored values for mapping by a model;

mapping, with the model, the values from the sequence to a quantity for the sequence indicative of a probability and/or confidence per data set that a start of a cut-in and/or lane changing event by the second vehicle is detected or that no start of the cut-in and/or lane changing event by the second vehicle is detected; and controlling, with an adaptive cruise control system, the first vehicle in response to the detection of the start of the cut-in and/or lane changing event according to a mapping result of the model.

9. The method of claim 8, further comprising distinguishing (204) whether the quantity indicates a true positive or a true negative depending on a threshold for the quantity.

10. The method of claim 9, further comprising receiving a plurality of values indicative of the position or movement of the plurality of values, and providing all values from the sequence for mapping by the model.

11. The method of claim 8, comprising:

receiving the sequence in a fixed timeframe.

12. The method of claim 8, further comprising capturing at least a part of the values with a set of cameras and/or receiving at last a part of the values from a set of camera signals that describe a time evolution of physical variables related to velocity, acceleration, position and/or distance of the second vehicle relative to the first vehicle or relative to at least one lane line separating a lane in which the first vehicle is located from a lane in which the second vehicle located.

13. The method of claim 8, further comprising:

providing each data set with a timestamp and determining a label at each timestamp.

14. The method of claim 8, further comprising:

eliminating one or more values from the received data sets that contain redundant information.

15. The method of claim 8, further comprising:

receiving the plurality of sequences of data sets; and labelling each data set as a cut-in maneuver or not the cut-in maneuver.

* * * * *